US008315628B2

(12) United States Patent  
Thermond

(10) Patent No.: US 8,315,628 B2  
(45) Date of Patent: Nov. 20, 2012

(54) CELLULAR NETWORK/WLAN VOIP SERVICE INTERACTION BY HOME WIRELESS ROUTER

(75) Inventor: Jeffrey L. Thermond, Saratoga, CA (US)

(73) Assignee: Broadcom Corporation, Irvine, CA (US)

(*) Notice: Subject to any disclaimer, the term of this patent is extended or adjusted under 35 U.S.C. 154(b) by 524 days.

(21) Appl. No.: 12/194,082

(22) Filed: Aug. 19, 2008

(65) Prior Publication Data

US 2008/0304460 A1  Dec. 11, 2008

Related U.S. Application Data

(63) Continuation of application No. 10/861,695, filed on Jun. 4, 2004, now Pat. No. 7,424,008.

(51) Int. Cl.
*H04W 36/00* (2009.01)
(52) U.S. Cl. .......................................... 455/436; 455/450
(58) Field of Classification Search .................. 455/415, 455/417, 436, 439, 442; 370/236, 245
See application file for complete search history.

(56) References Cited

U.S. PATENT DOCUMENTS

| 2003/0067903 A1* | 4/2003 | Jorgensen | 370/338 |
| 2005/0190747 A1* | 9/2005 | Sindhwani et al. | 370/352 |
| 2009/0298490 A9* | 12/2009 | Janik | 455/419 |

* cited by examiner

*Primary Examiner* — Tu X Nguyen
(74) *Attorney, Agent, or Firm* — Garlick & Markison; Kevin L. Smith

(57) ABSTRACT

A home wireless router establishes a Wireless Local Area Network (WLAN). The home wireless router services a plurality of wireless terminals within the WLAN service area, the plurality of wireless terminals including at least one Voice over Internet Protocol (VoIP) wireless terminal. The home wireless router receives a request to terminate a WLAN VoIP call to the VoIP wireless terminal. The home wireless router determines that the VoIP wireless terminal is currently servicing a cellular call via a cellular network. The home wireless router causes the cellular network to be misled into concluding that another cellular call is to be serviced by the VoIP wireless terminal, the cellular network places the cellular call on hold in the incorrect conclusion that it will service the another cellular call, and the WLAN VoIP call is terminated to the VoIP wireless terminal.

18 Claims, 12 Drawing Sheets

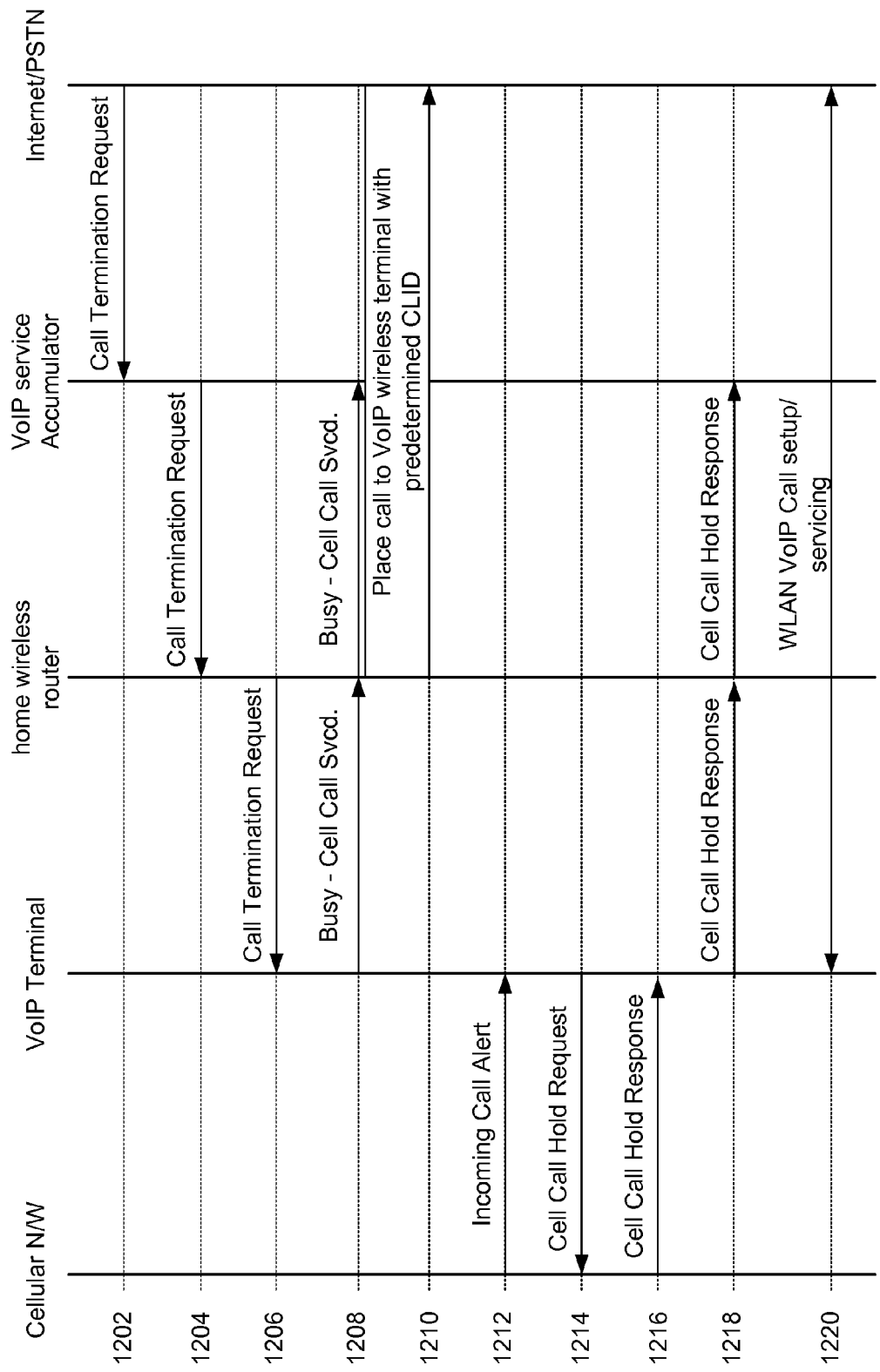

CELLULAR NETWORK/WLAN VOIP SERVICE INTERACTION BY HOME WIRELESS ROUTER

CROSS REFERENCE TO PRIORITY APPLICATION

The present U.S. Utility Patent Application claims priority pursuant to 35 U.S.C. 120, as a continuation, to the following U.S. Utility Patent Application which is hereby incorporated herein by reference in its entirety and made part of the present U.S. Utility Patent Application for all purposes:

1. U.S. Utility application Ser. No. 10/861,695, entitled "CELLULAR NETWORK/WLAN VoIP SERVICE INTERACTION BY HOME WIRELESS ROUTER,", filed Jun. 4, 2004, now issued as U.S. Pat. No. 7,424,008, on Sep. 9, 2008.

FIELD OF THE INVENTION

This invention relates generally to Wireless Local Area Networks (WLANs); and more particularly to the servicing of Voice over Internet Protocol (VoIP) communications by WLANs.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with one another other on a global basis. Wired Local Area Networks (wired LANs), e.g., Ethernets, are also quite common and support communications between networked computers and other devices within a serviced area. Wired LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11a networks, IEEE 802.11b networks, and IEEE 802.11g networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a serviced area. The wired backbone couples the WAPs of the IEEE 802.11 network to other networks, both wired and/or wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired LANs provide up to one Gigabit/second bandwidth and relatively soon, wired LANs will provide up to 10 Gigabit/second bandwidths. However, because of their advantages in servicing portable devices, WLANs are often deployed so that they support wireless communications in a service area that overlays with the service area of a wired LAN. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

Other devices may also use the WLAN to service their communication needs. One such device is a WLAN phone, e.g., an IEEE 802.11 phone that uses the WLAN to service its voice communications. The WLAN communicatively couples the IEEE 802.11 phone to other phones across the PSTN, other phones across the Internet, other IEEE 802.11 phones, and/or to other phones via various communication paths. IEEE 802.11 phones provide excellent voice quality and may be used in all areas serviced by the WLAN. Typically, the IEEE 802.11 phones support a Voice over Internet Protocol (VoIP) application. Thus, hereinafter, IEEE 802.11 phones may be also referred to as WLAN VoIP wireless terminals.

Significant problems exist, however, when using a WLAN to support VoIP calls. Because WLANs typically service both VoIP calls and data communications, the WLAN may not have sufficient wireless capacity to satisfy the low-latency requirements of the voice communication. The wireless capacity limitations are oftentimes exacerbated by channel access rules imposed in many IEEE 802.11 installations. Further, roaming within a WLAN (between WAPs) can introduce significant gaps in service, such gaps in service violating the low-latency requirements of the voice communication.

Home wireless routers oftentimes service WLANs (serve as WAPs) within a residential setting. The home wireless routers typically couple to the Internet via a cable modem or other broadband connection. The cable modem network capacity, however, is shared by a relatively large number of users and the availability of capacity to service communications between the home wireless router and the Internet varies over time. The limitations of this connection compromise the ability of the home wireless router to adequately service VoIP calls, even when the home wireless router's serviced WLAN has sufficient capacity. Such is the case because VoIP calls typically require a minimum of 64 Kbps for satisfactory service. When the broadband connection is a DSL connection at 384 kbps, for example, this limitation is even more pronounced.

Thus, there is a need in the art for improvements in the operation and management of WLAN devices, including home wireless routers, when servicing VoIP calls.

SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

FIG. 12 is a signal flow diagram illustrating operation according to the flow chart of FIGS. 9 and 10B.

DETAILED DESCRIPTION OF THE DRAWINGS

Figure 1:
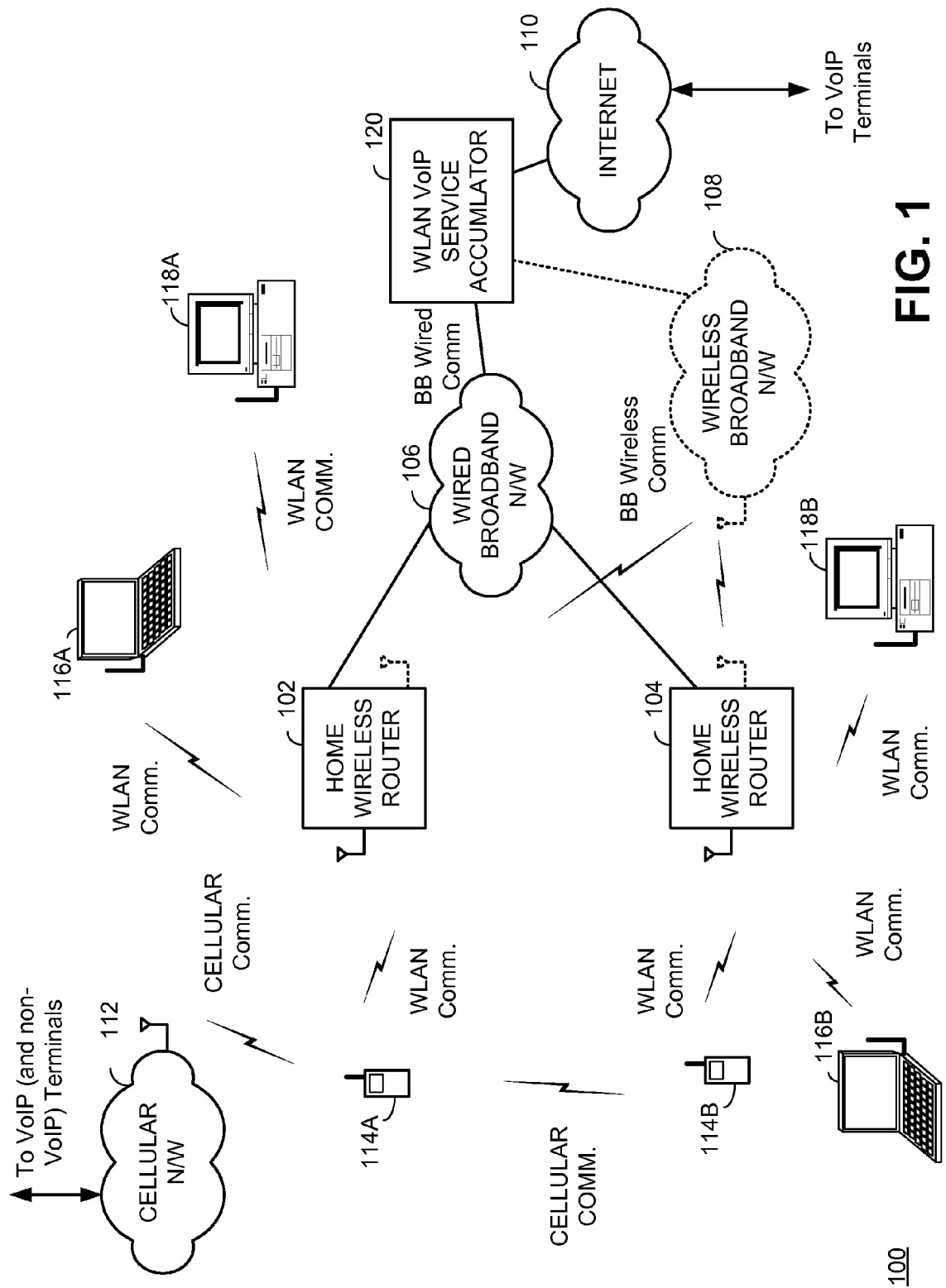
FIG. 1 is a system diagram illustrating a communication system constructed and operating according to the present invention.

FIG. 1 is a system diagram illustrating a communication system 100 constructed and operating according to the present invention. As shown in FIG. 1 the system 100 supports Wireless Local Area Network (WLAN) communications within at least one WLAN service area. Home wireless routers 102 and 104 each service wireless WLAN communications for respective WLAN service areas. Home wireless router 102 supports WLAN communications with wireless terminal 114A, wireless terminal 116A (laptop computer), and wireless terminal 118B (desktop computer). Likewise, home wireless router 104 supports WLAN communications within its respective WLAN service area. In supporting WLAN communications, home wireless router 104 supports wireless communications with wireless terminals 114B, 116B, and 118B. As the reader will appreciate, the numbers and types of wireless terminals that may be supported by the home wireless routers 102 and 104 vary from installation-to-installation.

Home wireless routers 102 and 104 support WLAN communications according to a standardized communication protocol. The WLAN communication protocol may be one or more of IEEE 802.11a, IEEE 802.11b, IEEE 802.11g, IEEE 802.11n, and/or another WLAN communication standard. Further, home wireless router 102 may support Wireless Personal Area Network (WPAN) communications via the Bluetooth communication standard, the IEEE 802.15 standard, or another communication standard.

Each of home wireless routers 102 and 104 couples to a broadband network via a broadband connection. In a first embodiment, a wired broadband network 106 services the broadband connections for the home wireless routers 102 and 104. The broadband network 106 may be a cable modem network or another wired network that provides the broadband connection, e.g., a DSL connection, a DSL2 connection, an ADSL connection, or an ADSL2 connection, for example. In another embodiment, a wireless broadband network 108 services the broadband connections for the home wireless routers 102 and 104. In such case, the wireless broadband network 108 may be a cellular wireless network that provides high speed data service, e.g., CDMA2000, UMTS, etc., a microwave network, a fixed wireless network, or another wireless connection. Still alternately, the broadband connection may be serviced via an optical network. In still another embodiment, the wired broadband network 106 services one broadband connection while the wireless broadband network 108 services another broadband connection. In any case, the WLAN VoIP service accumulator 120 will typically be an element of, or coupled to the wired broadband network 106 and/or the wireless broadband network 108.

The home wireless routers 102 and/or 104, the broadband networks 106 and/or 108, a WLAN Voice over Internet Protocol (VoIP) voice accumulator 120, and the Internet 110 (among other components) service VoIP calls for wireless terminals 114A, 114B, 116A, 116B, 118A, and 118B. The home wireless routers 102 and 104 determine particular needs of the wireless terminals 114A, 114B, 116A, 116B, 118A, and 118B and service the VoIP calls accordingly. The home wireless routers 102 and 104 operate in cooperation with the WLAN VoIP service accumulator 120 to meet these needs. These operations will be described further herein with reference to FIGS. 2-8.

According to another aspect of the present invention, at least one of the wireless terminals has dual wireless interfaces. One of the wireless interfaces allows a wireless terminal to interface with a cellular network 112 while another of the wireless interfaces allows the wireless terminal to interface with one of the home wireless routers 102 and 104. Operation according to the present invention includes handing over a VoIP call from the cellular network 112 to a WLAN serviced by either home wireless router 102 or 104. Another operation includes handing over a VoIP call serviced by home wireless router 102 or 104 to the cellular network 112.

Figure 2:
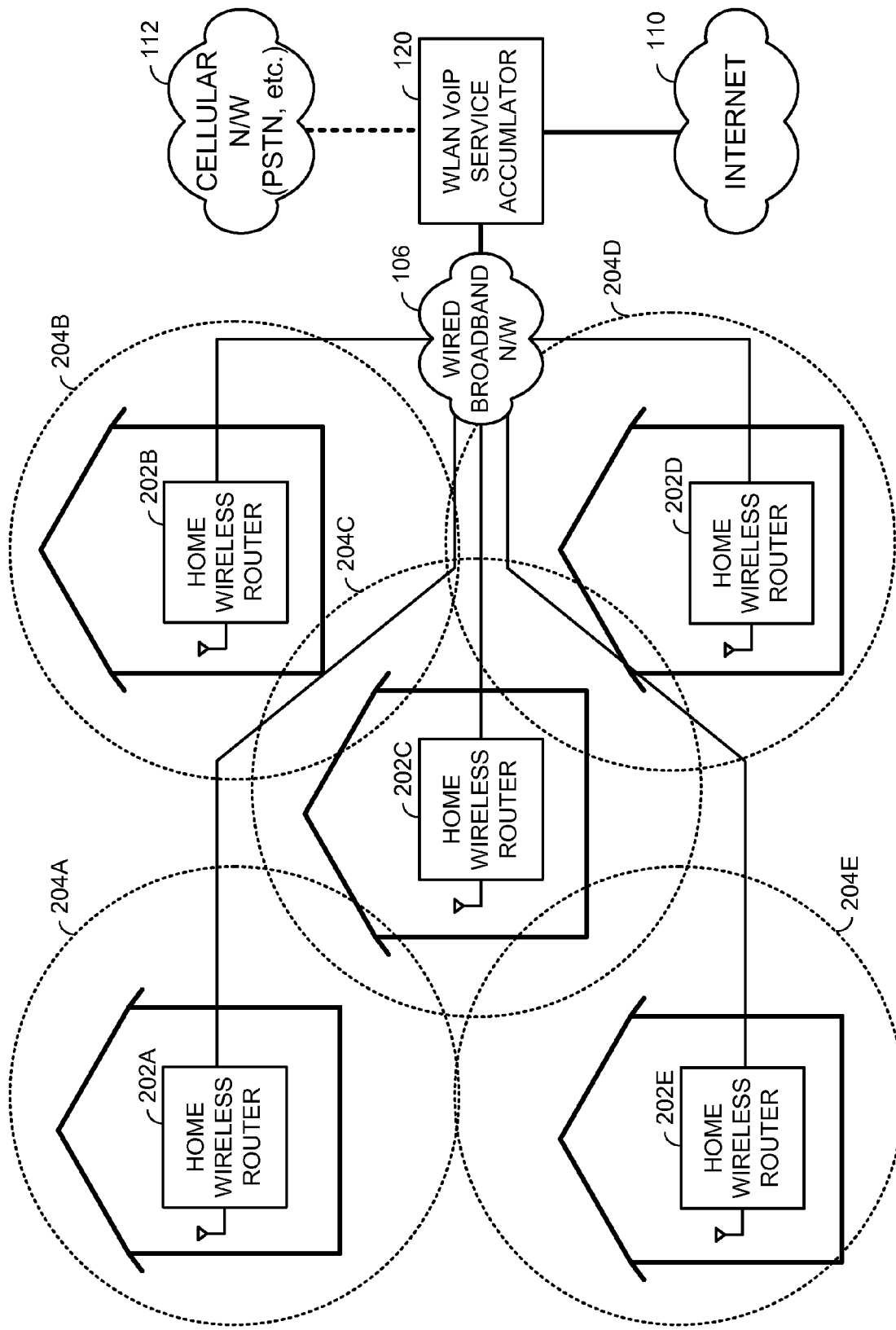
FIG. 2 is a system diagram illustrating a plurality of home wireless routers and their connection to a broadband network.

FIG. 2 is a system diagram illustrating a plurality of home wireless routers and their connection to a broadband network. Each of home wireless routers 202A-202E services a corresponding WLAN service area 204A-204E, respectively. Each of the home wireless routers 202A-202E couples to WLAN VoIP service accumulator 120 via wired broadband network 106. In an alternate embodiment, one or more of the home wireless routers 202A-202E couples to the WLAN VoIP service accumulator 120 via a wireless broadband network 108 (as was illustrated in FIG. 1). In combination, the WLAN service areas 204A-204E form a combined WLAN service area as illustrated. According to some aspects of the present invention, the WLAN VoIP service accumulator 120 works in conjunction with the home wireless router 202A-202E to provide wireless service in the combined WLAN service area formed by the plurality of individual WLAN service areas 204A-204E.

Figure 3:
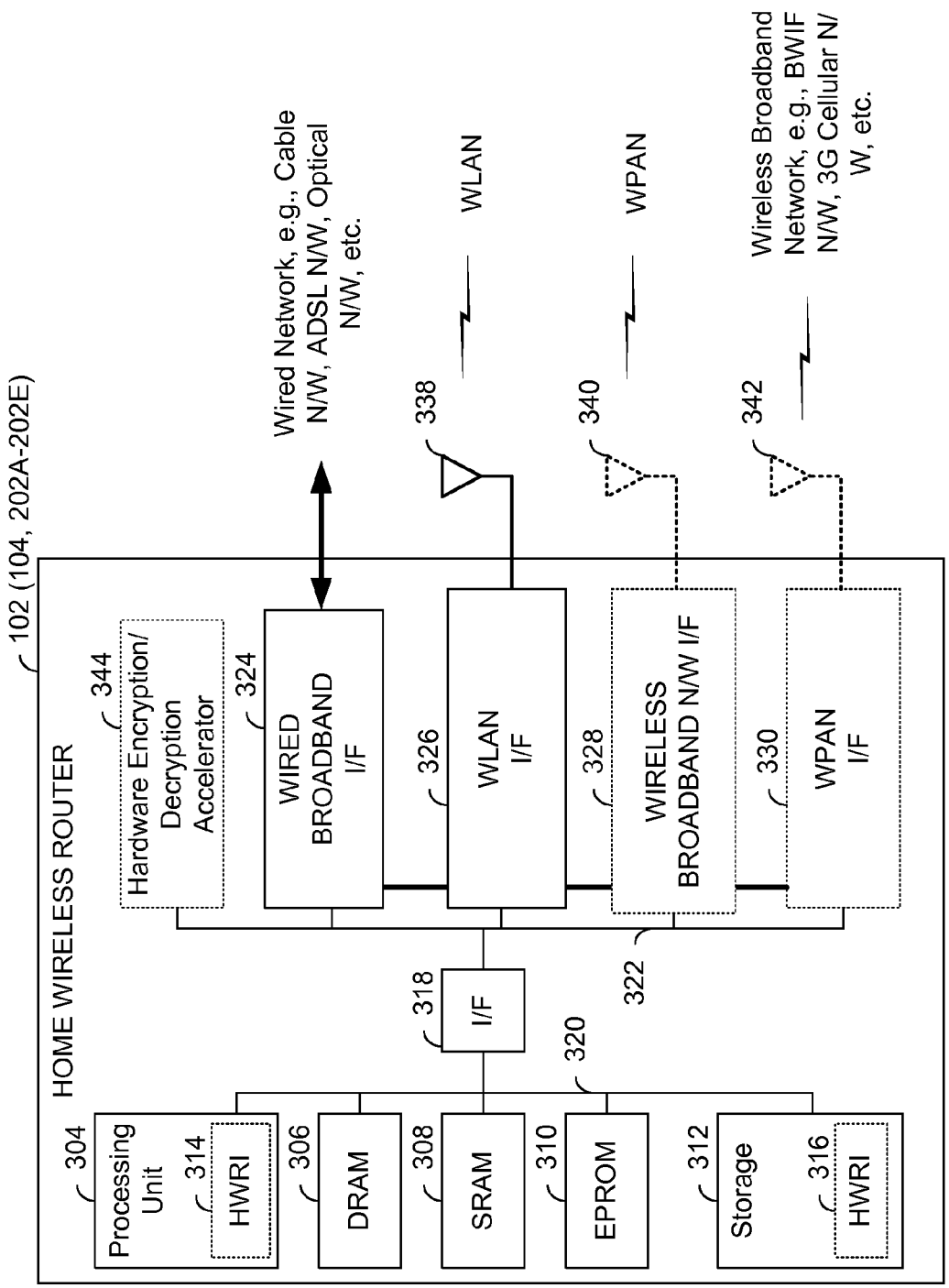
FIG. 3 is a block diagram illustrating a home wireless router constructed and operating according to the present invention.

FIG. 3 is a block diagram illustrating a home wireless router constructed and operating according to the present invention. The home wireless router 102 (104, 202A-202E)

includes a processing unit 304, Dynamic Random Access Memory (DRAM) 306, Static Random Access Memory (SRAM) 308, Erasable Programmable Read Only Memory (EPROM) 310, and storage 312. The processing unit 304 may be a microprocessor, a digital signal processor, a collection of microprocessors and/or digital signal processors, and/or any type of processing unit that is known to be able to execute software instructions and interface with other components. The DRAM 306, SRAM 308, and EPROM 310 are examples of types of memory that may be used in conjunction with the processing unit 304. The storage 312 may be hard-disk storage, tape storage, optical storage, or other types of storage that stores digital information that may be operated upon or executed by processing unit 304.

Home wireless router instructions (HWRI) 316 are stored in storage 312 and executed by processing unit 304 as HWRI 314. During certain portions of their execution, HWRI 316 may be written to one or more of DRAM 306, SRAM 308, and/or EPROM 310 prior to loading into the processing unit 304 as HWRI 314. The storage, loading, and execution of software instructions are generally known and will not be described further herein, except as it relates particularly to the operations of the present invention.

The processing unit 304, DRAM 306, SRAM 308, EPROM 310, and storage 312 intercouple via one or more processor buses 320. Processor bus 320 couples to peripheral bus 322 via interface 318. Coupled to peripheral bus 322 are wired broadband interface 324, WLAN interface 326, WPAN interface 330, and other components that may be present in various embodiments of the home wireless router. The wired broadband interface 324 interfaces to the broadband connection, which couples the home wireless router 102 to a broadband network, e.g., a cable network, an optical network, or another type of broadband network. The home wireless router 102 may also/alternatively include a wireless broadband network interface 328 and antenna 340 that provide a broadband wireless connection to a wireless broadband network.

The WLAN interface 326 couples to antenna 338 and services the WLAN within a WLAN service area of the home wireless router 102, as previously described with reference to FIG. 2. The WLAN interface 326, as was previously described, supports one or more of various WLAN protocol standards. Such protocol standards may include the IEEE 802.11a, IEEE 802.11b, IEEE 802.11g, and/or IEEE 802.11n protocol standards. The home wireless router 102 may further include the WPAN interface 330 that services a WPAN network about the home wireless router 102. The WPAN interface 330 services the Bluetooth protocol standard, the IEEE 802.15 protocol standard, or another similar standard.

According to one aspect of the present invention, the home wireless router 102 services multiple types of encryption and decryption operations. Particularly, the home wireless router 102 supports WLAN encryption operations for serviced VoIP wireless terminals and broadband encryption operations for the broadband network. Thus, in some embodiments, the home wireless router 102 includes a hardware encryption/decryption accelerator 344 for servicing the WLAN encryption operations and/or the broadband encryption/decryption operations. In some cases, the processing unit 304 services the WLAN encryption/decryption operations and/or the broadband encryption operations.

Figure 4:
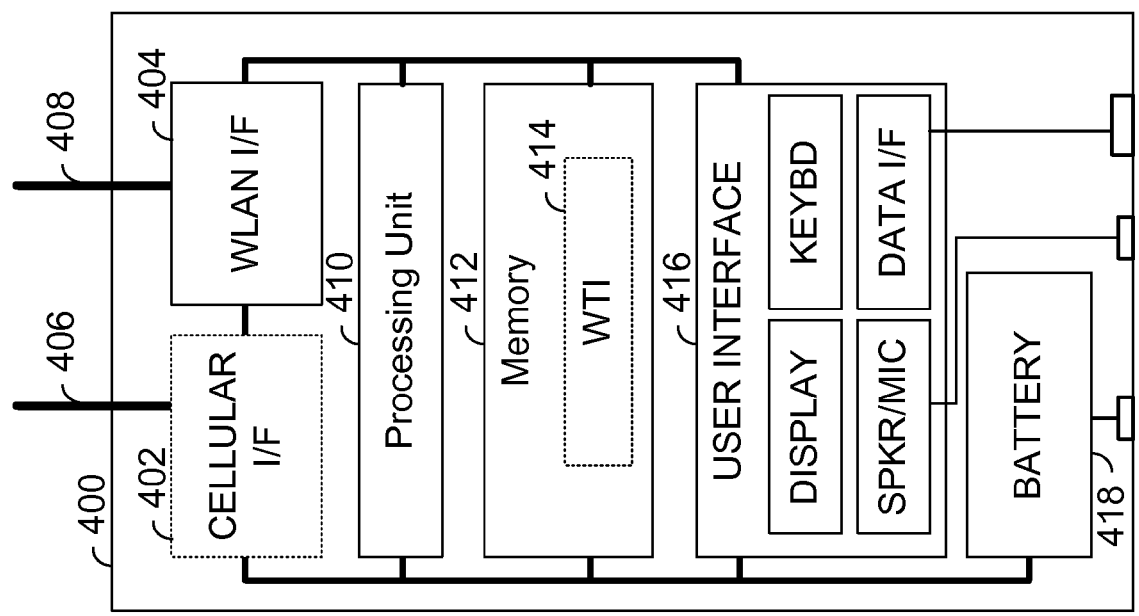
FIG. 4 is a block diagram illustrating a wireless terminal that services Voice over Internet Protocol (VoIP) operations according to the present invention.

FIG. 4 is a block diagram illustrating a wireless terminal that services VoIP operations according to the present invention. The VoIP wireless terminal 400 includes a WLAN interface 404 and may include a cellular interface 402. The WLAN interface 404 couples to antenna 408 and services WLAN communications with a home wireless router 102 or 104 as illustrated in FIG. 1. The cellular interface 402 and antenna 406 service communications with a cellular network 112 as illustrated in FIG. 1. Depending upon the particular construct of the VoIP wireless terminal 400, the cellular interface 402 may support a TDMA standard, e.g., IS-136, GSM, et cetera, a CDMA standard, e.g., IS-95A, IS-95B, 1XRTT, 1XEV-DO, 1XEV-DV, et cetera, or another cellular interface standard.

The VoIP wireless terminal 400 further includes a processing unit 410, memory 412, a user interface 416, and a battery 418. The processing unit may be a microprocessor, a digital signal processor, a combination of a microprocessor and digital signal processor or another type of processing device. The memory 412 may be SRAM, DRAM, or another type of memory that is generally known. Stored in memory 412 are Wireless Terminal Instructions (WTIs) 414 that are loaded into processing unit 410 for execution. These WTIs 414 may include WLAN and/or broadband encryption algorithm operations according to the present invention, as well as other instructions that cause the VoIP wireless terminal 400 to support VoIP operations. User interface 416 includes the display, keyboard, speaker/microphone, and a data interface. The data interface may be a wireless personal area network (WPAN) interface such as the Bluetooth interface or an IEEE 802.15 interface. Battery 418 provides power for the components of the VoIP wireless terminal.

Figure 5:
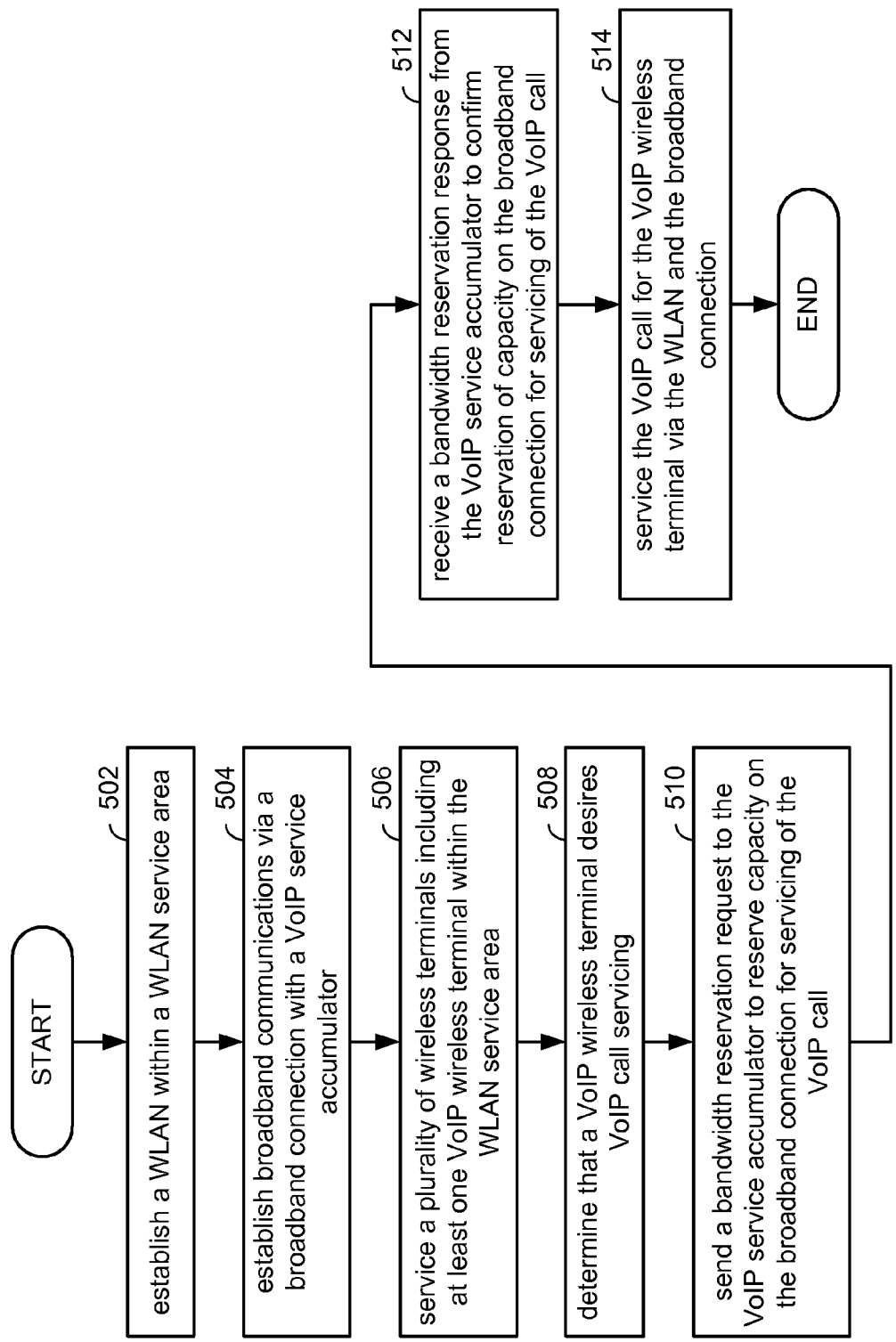
FIG. 5 is a flow chart illustrating the operation of a home wireless router according to the present invention.

FIG. 5 is a flow chart illustrating the operation of a home wireless router according to the present invention. Operations commence with the home wireless router establishing a WLAN within a WLAN service area (step 502). Generally, a WLAN is established according to the standardized protocol operations set forth in the relevant operating standards, which have been previously described. The WLAN service area is typically setup about the home wireless router. Next, operation includes establishing broadband communications via a broadband connection with a VoIP service accumulator (step 504). This broadband connection will be a wired connection, a wireless connection, or an optical connection. As was previously described with reference to FIGS. 1 and 2, the broadband connection may be serviced by a cable modem network, an optical link, etc. Further, the broadband connection may be a wireless point-to-point connection.

Operation continues with servicing a plurality of wireless terminals within the WLAN service area. Such servicing will include servicing at least one VoIP wireless terminal in the WLAN service area (step 506). Operation next includes determining that a VoIP wireless terminal desires VoIP call servicing within the WLAN service area (step 508). Upon making this determination, a bandwidth reservation request is sent from the home wireless router to the VoIP service accumulator via the broadband connection. The bandwidth reservation request is made in an attempt to reserve capacity on the broadband connection for servicing of the VoIP call of the VoIP wireless terminal (step 510). This bandwidth reservation request may conform to the resource reservation protocol (RSVP) operations. When the data reservation request conforms to the RSVP operations, servicing of the VoIP call for the VoIP wireless terminal may proceed according to the real batch time to transport protocol (RTP).

Operation continues in receiving a bandwidth reservation response from the VoIP service accumulator to confirm reservation of capacity of the broadband connection for servicing of the VoIP call (step 512). Again, the operations at step 512 may conform to the RSVP operations and in such case servicing the call may correspond to the RTP operations. Finally, with the bandwidth on the broadband connection reserved, operation includes servicing the VoIP call for the VoIP wireless terminal via the WLAN and the broadband connection (step 514). The VoIP call is serviced until terminated by either the VoIP wireless terminal or the far end VoIP terminal coupled via the Internet 110 or the broadband network.

Figure 6:
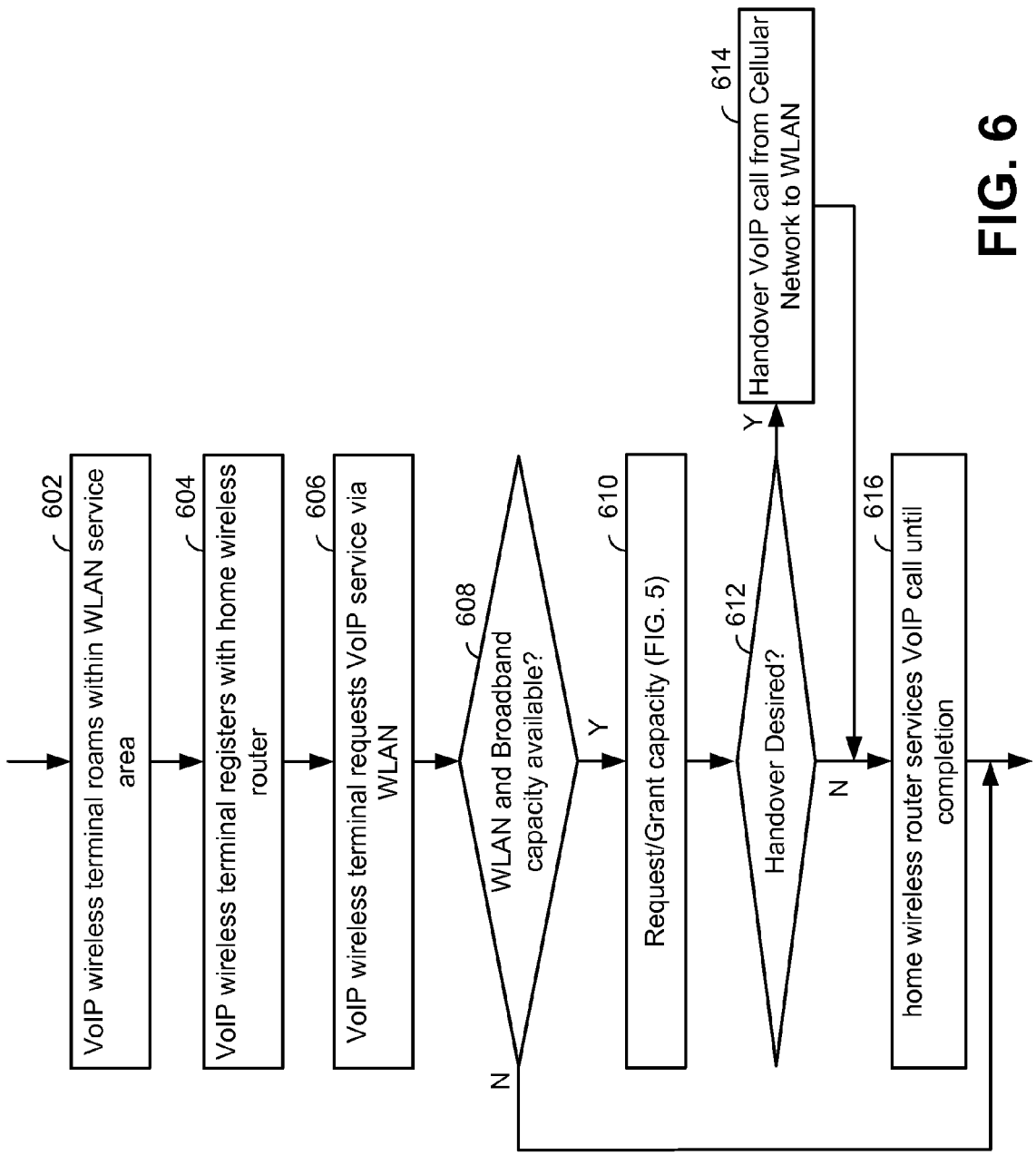
FIG. 6 is a flow chart illustrating operation according to the present invention in handing over a VoIP call from a cellular network to a WLAN.

FIG. 6 is a flow chart illustrating operation of the present invention in handing over a VoIP call from a cellular network to a WLAN. The operation of FIG. 6 commences with a VoIP wireless terminal roaming within a WLAN service area of a corresponding home wireless router (step 602). When the VoIP wireless terminal roams into the WLAN service area, the VoIP wireless terminal registers with the home wireless router servicing the WLAN service area (step 604). When the VoIP wireless terminal roams into a WLAN service area, or at some time thereafter, the VoIP wireless terminal requests VoIP call service from the WLAN (step 606). Prior to servicing the VoIP call service request, the home wireless router determines whether WLAN and broadband connection capacity is available for such servicing (step 608). In making this determination, the home wireless router may consider channel usage within the WLAN service area and/or its current broadband connection usage.

If either the WLAN or the broadband connection does not have sufficient capacity to service the VoIP call, the wireless terminal is denied access to the WLAN for VoIP call servicing. However, if capacity is available on both of these segments, the operation of FIG. 5 may be employed to request capacity on the broadband connection and to be granted capacity on the broadband connection (step 610). With the capacity of the broadband connection granted, it is next determined whether handover of the VoIP call from the cellular network is desired (step 612).

Handover of the VoIP call is only required if an ongoing VoIP call is being serviced by the cellular network. When the wireless terminal simply desires to initiate a VoIP call within the WLAN, no such handover is required. However, if handover of the VoIP call is required from the cellular network to the WLAN, such operation is completed (step 614). In order to handover the VoIP call from the cellular network to WLAN, interaction with the cellular network 112 is required. Interaction with the cellular network requires signaling between the home wireless router and a signaling element of the cellular network 112. This signaling may alternately be provided by the VoIP service accumulator instead of directly between the home wireless router with the cellular network 112. In such case, the VoIP service accumulator acts as an agent for the home wireless router. When handoff is completed (from step 614) or when handoff is not required (from step 612), the home wireless router services the VoIP call until completion (step 616). From step 616, operation is completed.

Figure 7:
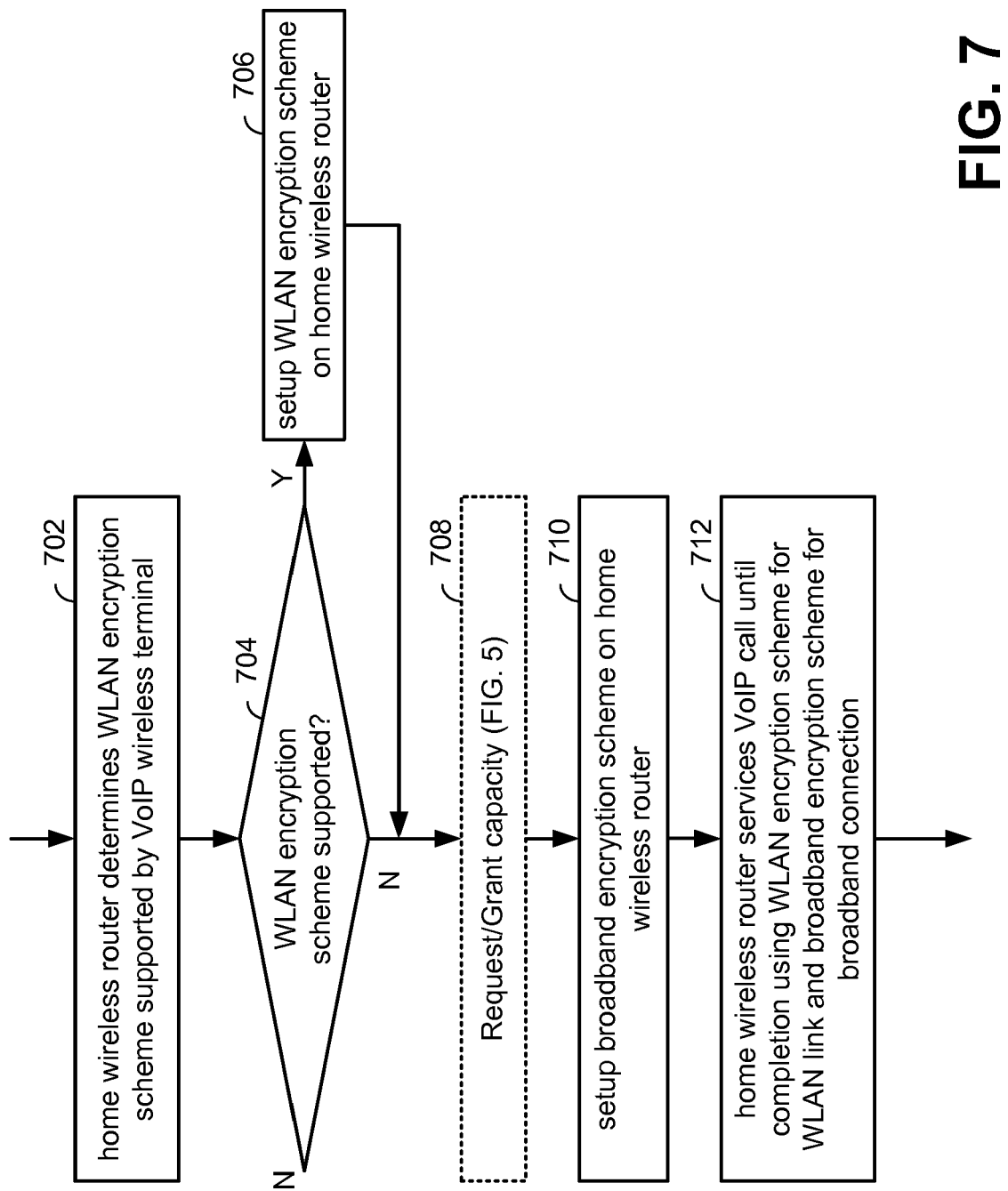
FIG. 7 is a flow chart illustrating operation according to the present invention in servicing both WLAN and broadband encryption schemes.

FIG. 7 is a flow chart illustrating operation according to the present invention in servicing both WLAN and broadband encryption schemes. Referring now to FIG. 7, when servicing a VoIP call for a wireless terminal, a particular encryption scheme may be employed by the VoIP wireless terminal. The WLAN interface of the home wireless router will typically support one or more encryption schemes. Currently, WLANs support various WLAN encryption schemes. One particular WLAN encryption scheme is the Wired Equivalency Privacy (WEP) encryption protocol. Another WLAN encryption scheme is the Wi-Fi Protected Access (WPA) encryption protocol. The WPA encryption protocol is similar to the IEEE 802.11i encryption protocol, which may be referred to as WPA2. Each of these WLAN encryption schemes provides some security for WLAN VoIP calls. These types of WLAN encryption schemes, however, are typically less secure than broadband encryption schemes serviced by other types of communication devices. According to one aspect of the present invention, WLAN encryption schemes are supported for WLAN communications while broadband encryption schemes are supported for communications on the broadband connection.

Thus, according to the present invention, when the home wireless router initially services a VoIP call for a VoIP wireless terminal, the home wireless router identifies a WLAN encryption scheme that the VoIP wireless terminal supports (step 702). In other operations, the home wireless router will presume a particular WLAN encryption scheme that the VoIP wireless terminal supports. The home wireless router then determines whether it supports the WLAN encryption scheme of the VoIP wireless terminal (step 704). If the home wireless router does support the WLAN encryption scheme employed by the VoIP wireless terminal, the home wireless router sets up the WLAN encryption scheme for servicing (step 706).

Next, from both step 706 and from a negative determination at step 704, the home wireless router optionally requests and is granted capacity on the broadband connection for servicing of the VoIP call (step 708). Then, in servicing the VoIP call for the VoIP wireless terminal, the home wireless router sets up a broadband encryption scheme for subsequent communications via the broadband connection (step 710). Finally, the home wireless router services the VoIP call until completion using a WLAN encryption scheme for the WLAN link and a broadband encryption scheme for the broadband connection (step 712). Thus, WLAN wireless communications between the VoIP wireless terminal and the home wireless router are protected by a WLAN encryption scheme while the wired communications and the broadband connection are protected by a broadband encryption scheme.

Referring again to FIG. 3, the broadband encryption scheme(s) may be implemented and serviced by the hardware encryption/decryption accelerator 344. Further, the processing unit 304 of the home wireless router 102 via its HWRI 314 may service one or both of the encryption schemes.

Figure 8:
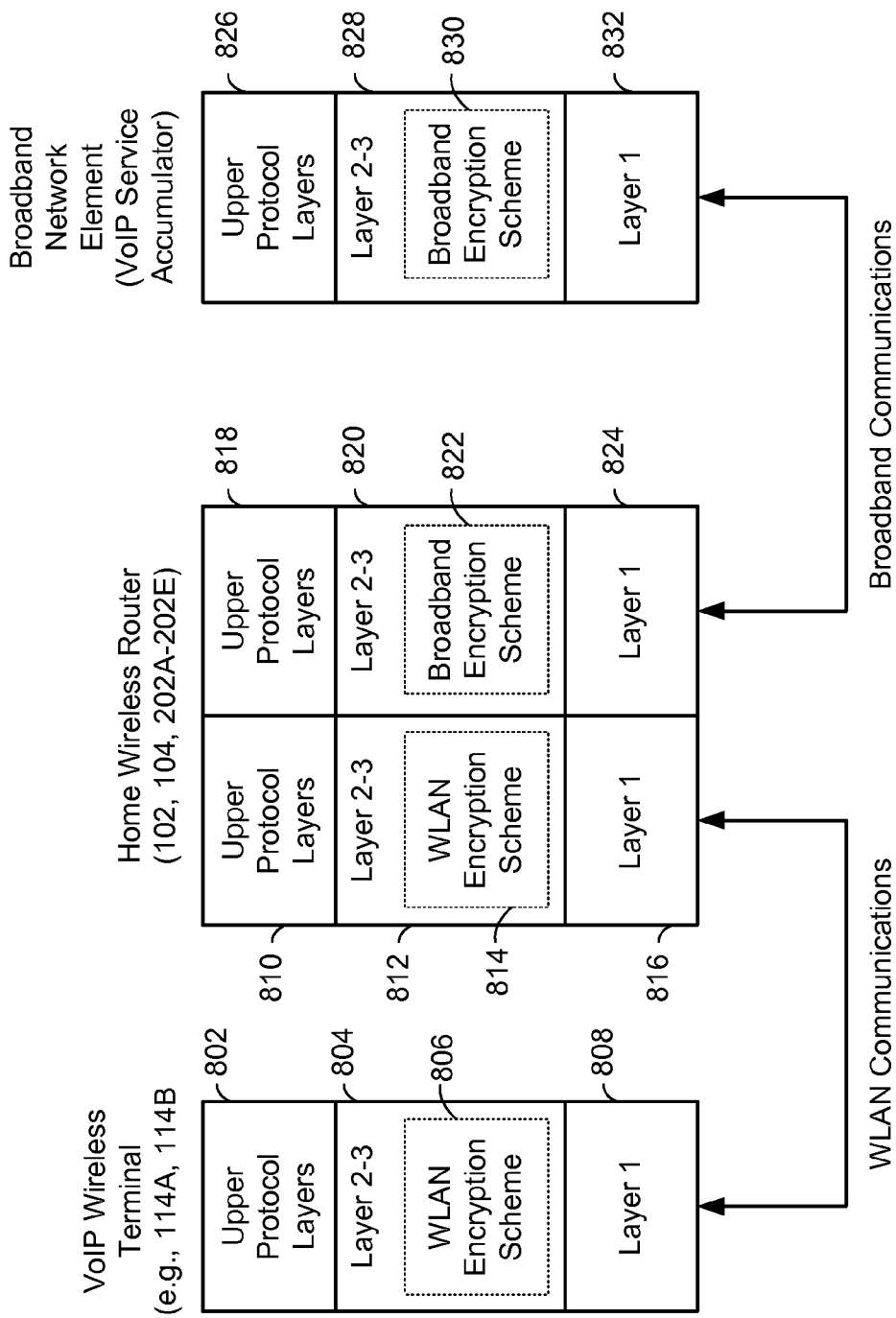
FIG. 8 is a block diagram illustrating the manner in which WLAN encryption schemes and broadband encryption schemes are serviced according to the present invention.

FIG. 8 is a block diagram illustrating the manner in which WLAN encryption schemes and broadband encryption schemes are serviced according to the present invention. The protocol layer operations of the VoIP wireless terminal, the home wireless router, and a broadband network element, e.g., the VoIP service accumulator are illustrated. Protocol layers supported by the VoIP wireless terminal include upper layers 802, layers 2 and 3 804, and layer 1 808. In the embodiment of FIG. 8, the WLAN encryption scheme 806 is implemented in layer 2 and/or layer 3 804 on the VoIP wireless terminal. As was previously described, examples of the WLAN encryption scheme are the WEP standard, the WPA standard, and the 802.11i encryption standard (WPA2), among others.

Layer 1 808 of the VoIP wireless terminal communicates directly with layer 1 816 of the home wireless router via a wireless link of the WLAN. In servicing WLAN communications, the home wireless router includes upper protocol layers 810, layers 2 and 3 812, and layer 1 816. The WLAN encryption scheme 814 serviced by the home wireless router resides at layer 2 and/or layer 3 812.

Home wireless router also includes protocol layers that service broadband communications with the VoIP service accumulator. These protocol layers include upper protocol layers 818, layer 2 and 3 820, and layer 1 824. One example of a broadband encryption scheme 822 serviced by the home wireless router operates at layer 2 and/or layer 3. The broadband communications between the home wireless router and the VoIP service accumulator are via a wired broadband connection, a wireless broadband connection, or an optical broadband connection. In communicating with the home wireless router, the VoIP service accumulator includes layer 1 832, layer 2 and layer 3 828, and upper protocol layers 826.

Figure 9:
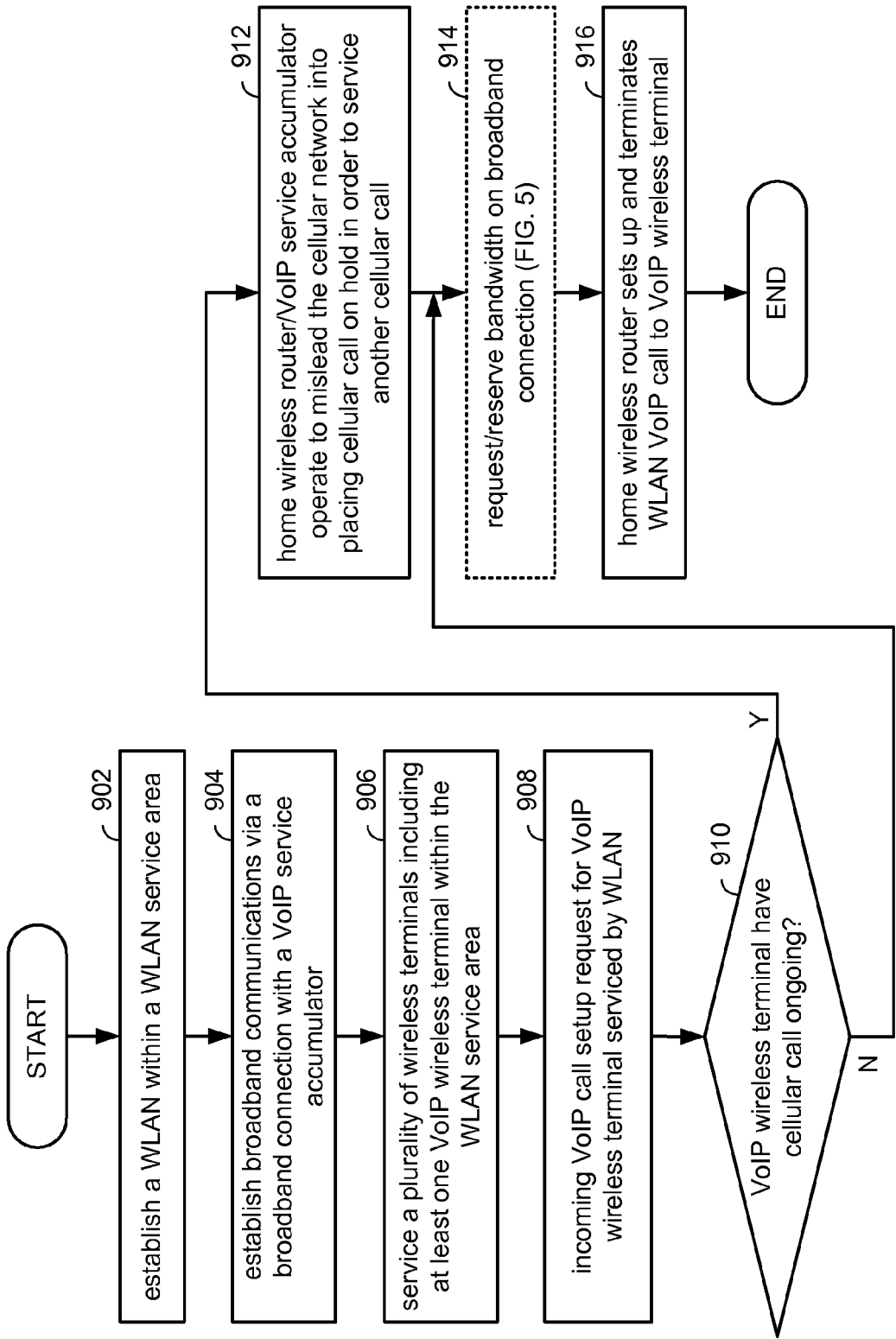
FIG. 9 is a flow chart illustrating operation according to the present invention in servicing a WLAN VoIP call.

FIG. 9 is a flow chart illustrating operation according to the present invention in servicing a WLAN VoIP call. Referring now to FIG. 9, operation commences with the establishment of a WLAN within a WLAN service area (step 902). Operation continues in establishing broadband communications via a broadband connection with a VoIP service accumulator (step 904). Next, a plurality wireless terminals including at least one VoIP wireless terminal are serviced within the WLAN service area (step 906). Then, according to the present invention, an incoming WLAN VoIP call setup request is received requesting that a WLAN VoIP call be terminated to the VoIP wireless terminal service by the WLAN (step 908).

When the incoming WLAN VoIP call setup request is received, the home wireless router determines whether or not the VoIP wireless terminal has an ongoing cellular call (step 910). When the VoIP wireless terminal does have an ongoing cell call as determined in step 910, the home wireless router and/or the VoIP service accumulator operates to mislead the cellular network into concluding that it is placing the cellular call on hold in order to service another cellular call (step 912). Particular embodiments of the operation of step 912 will be further described with reference to FIGS. 10A and 10B.

From both step 912 and from a negative determination at step 910, operation proceeds to step 914. At step 914, the home wireless router may request and receive a reservation of bandwidth on the broadband connection as was previously described with reference to FIG. 5. Then, the home wireless router sets up and terminates the WLAN VoIP call to the VoIP wireless terminal (step 916). Operation ends after the servicing of the WLAN VoIP call for the VoIP wireless terminal via the WLAN has concluded.

Figures 10A, 10B:
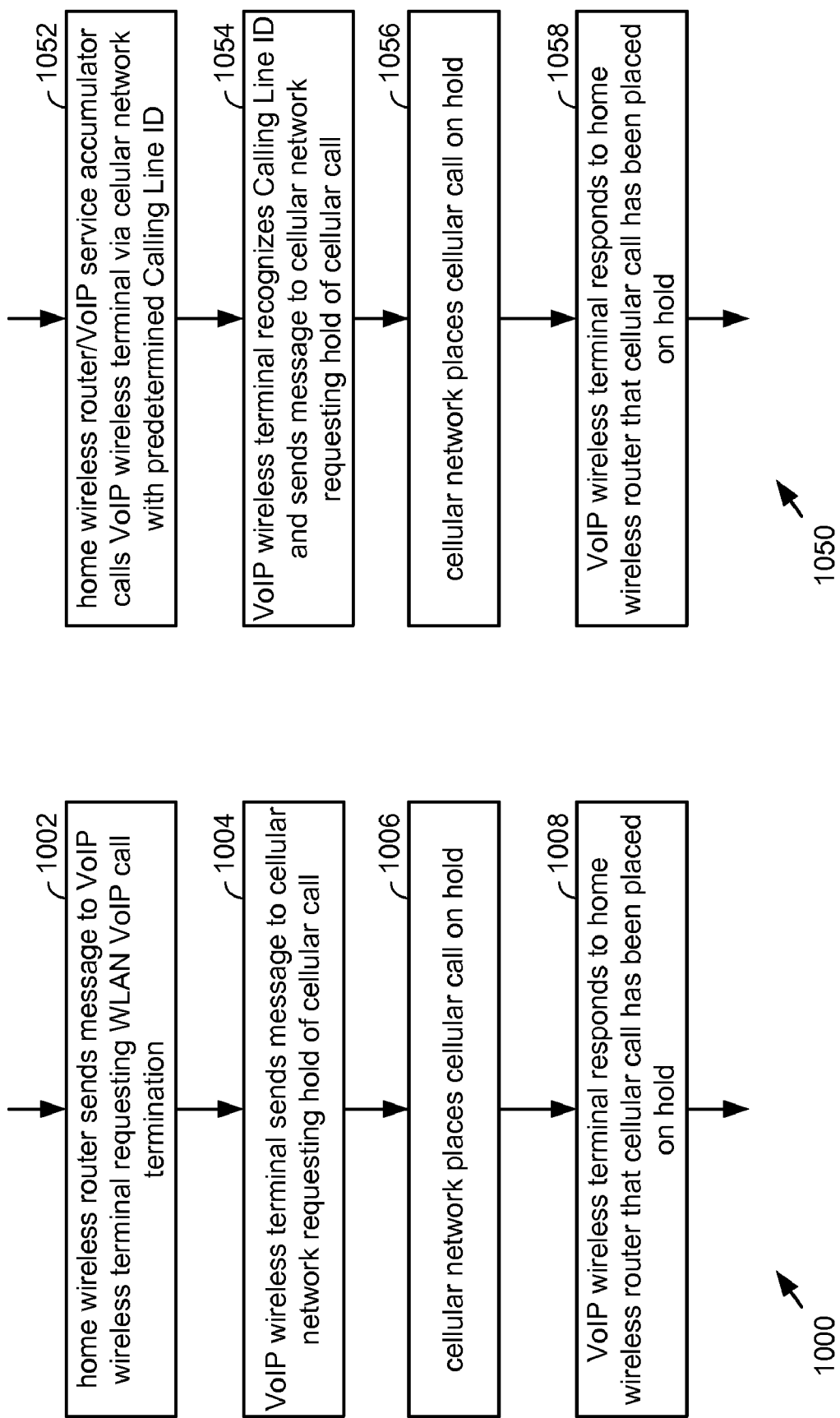
FIG. 10A is a flow chart illustrating a first embodiment according to the present invention in misleading a cellular network into concluding that another cellular call is incoming for a VoIP wireless terminal.
FIG. 10B is a flow chart illustrating a second embodiment according to the present invention in misleading a cellular network into concluding that another cellular call is incoming for a VoIP wireless terminal.

FIG. 10A is a flow chart illustrating a first embodiment 1000 according to the present invention in misleading a cellular network into concluding that another cellular call is incoming for a VoIP wireless terminal. As shown in FIG. 10A, in misleading the cellular network into concluding that another cellular call is incoming from the VoIP wireless terminal, the home wireless router first sends a message to the VoIP wireless terminal requesting WLAN VoIP call termination (step 1002). The home wireless router and the VoIP service accumulator possess prior knowledge that the VoIP wireless terminal is currently servicing a cellular call. In response, the VoIP wireless terminal sends a message to the cellular network requesting that the cellular network place the cellular call on hold (step 1004). After the VoIP wireless terminal has sent the request to the cellular network to place the cellular call on hold, the cellular network places the cellular call on hold (step 1006). With the cellular call placed on hold, the VoIP wireless terminal responds to the home wireless router that the cellular call has been placed on hold (step 1008).

The operations of FIG. 10A according to the present invention may require some modification of the VoIP wireless terminal of FIG. 4. Such modification may be performed by simply altering the WTI 414 that are stored on and executed by the VoIP wireless terminal 400. However, according to another embodiment of the present invention, the steps of FIG. 10A may be particularly employed without modification of the VoIP wireless terminal.

FIG. 10B is a flow chart illustrating a second embodiment 1050 according to the present invention in misleading a cellular network into concluding that another cellular call is incoming for a VoIP wireless terminal. As a first operation, the home wireless router and/or the VoIP service accumulator call the VoIP wireless terminal via the cellular network with a pre-determined calling line ID (step 1052). The VoIP wireless terminal recognizes the calling line ID received via the cellular network and sends a message in response thereto to the cellular network requesting that the cellular network place the cellular call on hold (step 1054). In response thereto, the cellular network places the cellular call on hold (step 1056). With the cellular call placed on hold, the VoIP wireless terminal responds to the home wireless router that the cellular call has been placed on hold (step 1058). Thus, with these operations complete, the VoIP wireless terminal then receives the WLAN VoIP call from the WLAN.

Figure 11:
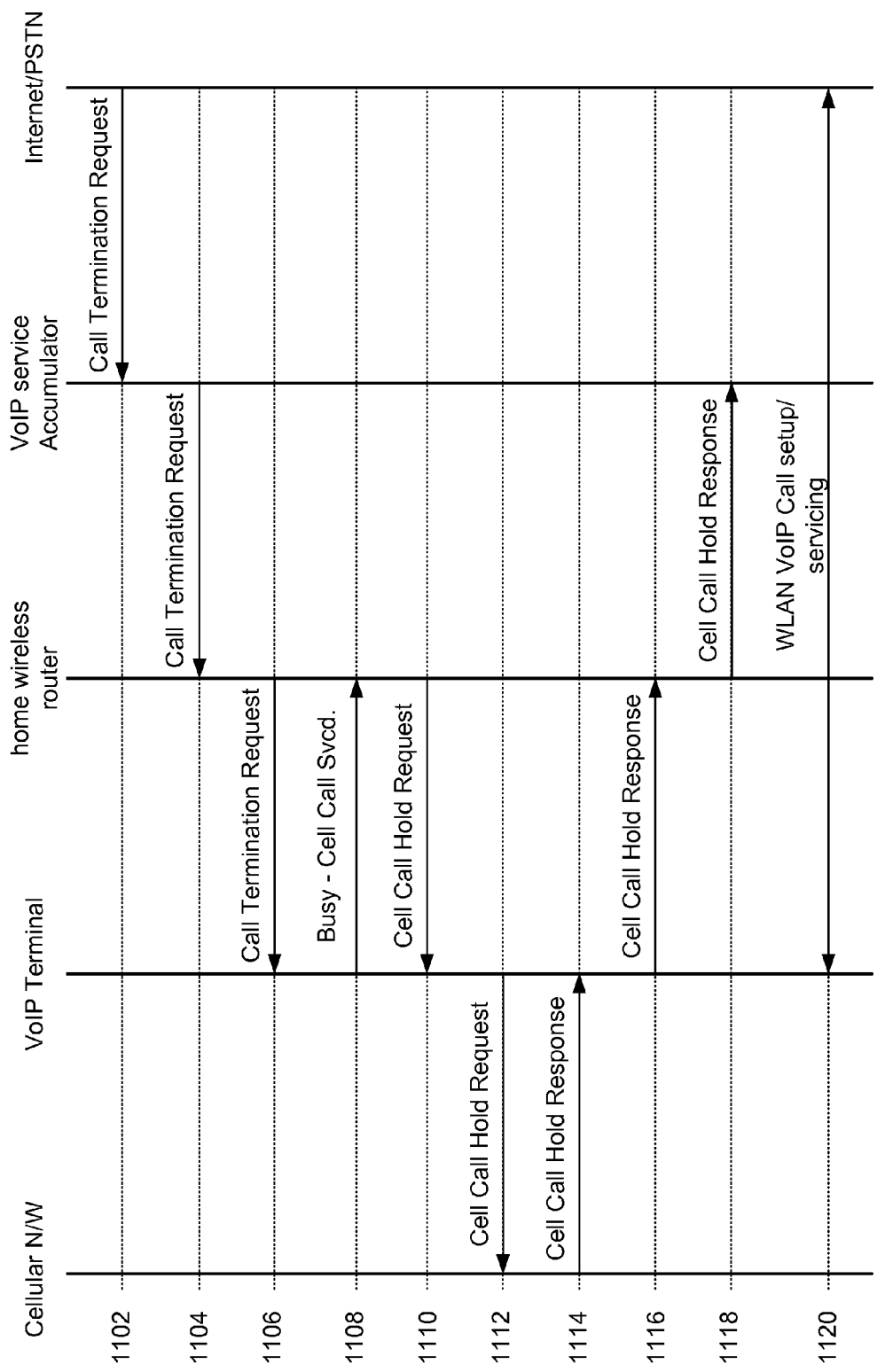
FIG. 11 is a signal flow diagram illustrating operation according to the flow chart of FIGS. 9 and 10A.

FIG. 11 is a signal flow diagram illustrating operation according to the flow chart of FIGS. 9 and 10A. These operations 1100 illustrate one particular embodiment in which the home wireless router/VoIP service accumulator/VoIP wireless terminal mislead(s) the cellular network into concluding that another cellular call in incoming for the VoIP wireless terminal. The VoIP service accumulator first receives a WLAN VoIP call termination request from the Internet/PSTN (step 1102). The VoIP service accumulator forwards this WLAN VoIP call termination request to the home wireless router (step 1104). The home wireless router then determines that the VoIP wireless terminal is operating within the WLAN and sends a WLAN VoIP call termination request to the VoIP wireless terminal (step 1106). However, because the VoIP wireless terminal is currently servicing a cellular call, the VoIP wireless terminal responds to the home wireless router that it is busy and currently servicing a cellular telephone call (step 1108).

In response to this message from the VoIP wireless terminal, the home wireless router sends a message to the VoIP wireless terminal requesting that the cellular call be placed on hold (step 1110). The VoIP wireless terminal, upon receiving this cellular call hold request, resultantly sends a cellular call hold request to the cellular network (step 1112). The cellular network, believing that the VoIP wireless terminal would like to initiate another call via the cellular network, responds to the VoIP wireless terminal with a cellular call hold response (step 1114). With the cellular call placed on hold, the VoIP wireless terminal response the home wireless router with a cell call hold response (step 1116). The home wireless router responds by sending a cellular call hold response to the VoIP service accumulator (step 1118). Finally, with the VoIP wireless terminal capable of servicing the WLAN VoIP call, the home wireless router and the VoIP service accumulator set up the WLAN VoIP call and services until completion via the VoIP wireless terminal and the Internet/PSTN (step 1120).

FIG. 12 is a signal flow diagram illustrating operation according to the flow chart of FIGS. 9 and 10B. In a first operation, the VoIP service accumulator receives a WLAN VoIP call termination request from the Internet/PSTN (step 1202). The VoIP service accumulator forwards the WLAN VoIP call termination request to the home wireless router that currently services the VoIP wireless terminal (step 1204). The home wireless router then sends the WLAN VoIP call termination request to the VoIP wireless terminal (step 1206). Since the VoIP wireless terminal is currently servicing a cellular call, the VoIP wireless terminal responds to the home wireless router with a message indicating that it is currently servicing a cell call (step 1208). The home wireless router responds to the VoIP service accumulator with a message indicating that the VoIP wireless terminal is currently servicing a cellular call (also at step 1208). In response thereto, the home wireless router and/or the VoIP service accumulator place a call to the VoIP wireless terminal via the cellular network with a predetermined calling line ID (step 1210). As is illustrated in FIG. 12, this call setup is performed via the Internet/PSTN, which accesses the cellular network for cellular call delivery to the VoIP wireless terminal.

The cellular network receives the call setup request from the home wireless router/VoIP service accumulator and provides the VoIP wireless terminal with an incoming call alert (step 1212). In response to this incoming call alert, the VoIP wireless terminal requests that the cellular network place the currently ongoing cell call on hold (step 1214). In response thereto, the cellular network places the ongoing cellular call on hold and responds to the VoIP wireless terminal that the cell call has been placed on hold (step 1216). Note that the call placed by the home wireless router/VoIP service accumulator (at step 1210) is not terminated to the VoIP wireless terminal via the cellular network. According to the present invention, the VoIP wireless terminal, in response to receiving the call via the cellular network with the calling line ID, responds to the home wireless router with a cell call hold response (step 1218). The cell call hold response is forwarded from the home wireless router to the VoIP service accumulator at step 1218. With these operations completed, the VoIP wireless terminal is available for servicing the WLAN VoIP call and the call is setup between the VoIP wireless terminal and the Internet/PSTN via the home wireless router/VoIP service accumulator and terminated to the VoIP wireless terminal (step 1220).

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating at least one component of a Wireless Local Area Network (WLAN) that supports wireless communications within a WLAN service area, the method comprising:
   servicing a Voice over Internet Protocol (VoIP) wireless terminal within the WLAN service area;
   receiving a request to terminate a WLAN VoIP call to the VoIP wireless terminal;
   determining that the VoIP wireless terminal is currently servicing a cellular call via a cellular network;
   communicating to mislead the cellular network into concluding that another cellular call is to be serviced by the VoIP wireless terminal and to cause the cellular network to place the cellular call on hold in the incorrect conclusion that it will service the another cellular call; and
   setting up and terminating the WLAN VoIP call to the VoIP wireless terminal, wherein the WLAN VoIP call is serviced over a broadband connection with a reserved capacity, and limiting access to the WLAN to adequately service the WLAN VoIP call.

2. The method of claim 1, wherein the communicating to mislead the cellular network into concluding that another cellular call is to be serviced by the VoIP wireless terminal and to cause the cellular network to place the cellular call on hold in the incorrect conclusion that it will service the another cellular call comprises:
   sending a message to the VoIP wireless terminal requesting WLAN VoIP call termination; and
   the message causing the VoIP wireless terminal to send a message to the cellular network requesting placement of the cellular call on hold.

3. The method of claim 2, further comprising receiving another message from the VoIP wireless terminal indicating that the cellular call has been placed on hold.

4. The method of claim 2, wherein the message causes the VoIP wireless terminal to send another message to the cellular network requesting placement of the cellular call on hold.

5. The method of claim 1 wherein the communicating to mislead the cellular network into concluding that another cellular call is to be serviced by the VoIP wireless terminal and to cause the cellular network to place the cellular call on hold in the incorrect conclusion that it will service the another cellular call comprises initiating another cellular call with a predetermined Calling Line ID to the VoIP wireless terminal via the cellular network that causes:
   the cellular network to attempt to terminate the another cellular call to the VoIP wireless terminal;
   the VoIP wireless terminal to recognize the Calling Line ID; and
   the VoIP wireless terminal to send a message to a serving cellular network requesting placement of the cellular call on hold.

6. The method of claim 2, further comprising receiving another message from the VoIP wireless terminal indicating that the cellular call has been placed on hold.

7. The method of claim 1, further comprising establishing the broadband connection from a group consisting of a cellular network connection, a microwave connection, and a fixed wireless connection.

8. The method of claim 1, further comprising establishing the broadband connection from a group consisting of a cable modem connection, a DSL connection, a DSL2 connection, an ADSL connection, and an ADSL2 connection.

9. The method of claim 1, wherein the WLAN VoIP call is served with the reserved capacity over the broadband connection further comprising:
   sending a bandwidth reservation request to a VoIP service accumulator to reserve capacity on the broadband connection for servicing of the WLAN VoIP call; and
   receiving a bandwidth reservation response from the VoIP service accumulator to confirm reservation of capacity on the broadband connection for servicing of the WLAN VoIP call.

10. The method of claim 1, further comprising servicing the WLAN VoIP call via the broadband connection using a WLAN encryption scheme.

11. A wireless router for servicing a Wireless Local Area Network (WLAN) comprising:
- a WLAN interface;
- a broadband interface; and
- a processing unit communicatively coupled to the WLAN interface and to the broadband interface, wherein the processing unit, in cooperation with at least one of the WLAN interface and the broadband interface is operable to:
  - service a Voice over Internet Protocol (VoIP) wireless terminal within a WLAN service area;
  - receive a request to terminate a WLAN VoIP call to the VoIP wireless terminal;
  - determine that the VoIP wireless terminal is currently servicing a cellular call via a cellular network;
  - communicate to mislead the cellular network into concluding that another cellular call is to be serviced by the VoIP wireless terminal to cause the cellular network to place the cellular call on hold in the incorrect conclusion that it will service the another cellular call; and
  - set up and terminate the WLAN VoIP call to the VoIP wireless terminal, wherein the WLAN VoIP call is serviced over a broadband connection with a reserved capacity to limit access to the WLAN to adequately service the WLAN VoIP call.

12. The wireless router of claim 11, wherein in the communicating to mislead the cellular network into concluding that the another cellular call is to be serviced by the VoIP wireless terminal to cause the cellular network to place the cellular call on hold in the incorrect conclusion that it will service the another cellular call, the processor, in cooperation with at least one of the WLAN interface and the broadband interface, is operable to send a message to the VoIP wireless terminal requesting WLAN VoIP call termination, which causes the VoIP wireless terminal to send another message to the cellular network requesting placement of the cellular call on hold.

13. The wireless router of claim 12, wherein the processing unit, in cooperation with at least one of the WLAN interface and the broadband interface is further operable to receive yet another message from the VoIP wireless terminal indicating that the cellular call has been placed on hold.

14. The wireless router of claim 12, wherein the processing unit, in cooperation with at least one of the WLAN interface and the broadband interface is further operable to cause the VoIP wireless terminal to request that the cellular call be placed on hold so that yet another cellular call can be initiated by the VoIP wireless terminal.

15. The wireless router of claim 11 wherein in the communicating to mislead the cellular network into concluding that the another cellular call is to be serviced by the VoIP wireless terminal to cause the cellular network to place the cellular call on hold in the incorrect conclusion that it will service the another cellular call, the processor, in cooperating with at least one of the WLAN interface and the broadband interface, is operable to initiate the another cellular call with a predetermined Calling Line ID to the VoIP wireless terminal via the cellular network so that:
- the cellular network attempts to terminate the another cellular call to the VoIP wireless terminal;
- the VoIP wireless terminal recognizes the Calling Line ID; and
- the VoIP wireless terminal sends another message to a serving cellular network requesting placement of the cellular call on hold.

16. The wireless router of claim 15, wherein the processing unit, in cooperation with at least one of the WLAN interface and the broadband interface is further operable to receive yet another message from the VoIP wireless terminal indicating that the cellular call has been placed on hold.

17. The wireless router of claim 11, wherein the processing unit, in cooperation with at least one of the WLAN interface and the broadband interface is operable to establish the broadband connection as a wireless broadband connection selected from a group consisting of a cellular network connection, a microwave connection, and a fixed wireless connection.

18. The wireless router of claim 11, wherein the processing unit, in cooperation with at least one of the WLAN interface and the broadband interface is operable to establish the broadband connection as a wired broadband connection selected from a group consisting of a cable modem connection, a DSL connection, a DSL2 connection, an ADSL connection, and an ADSL2 connection.

* * * * *